July 17, 1928.                                                                 1,677,808
F. ALASSIO ET AL
METHOD AND MEANS FOR PRODUCING EARTHENWARE
PIPES AND PRODUCTS RESULTING THEREFROM
Filed Oct. 29, 1925                    2 Sheets-Sheet 1
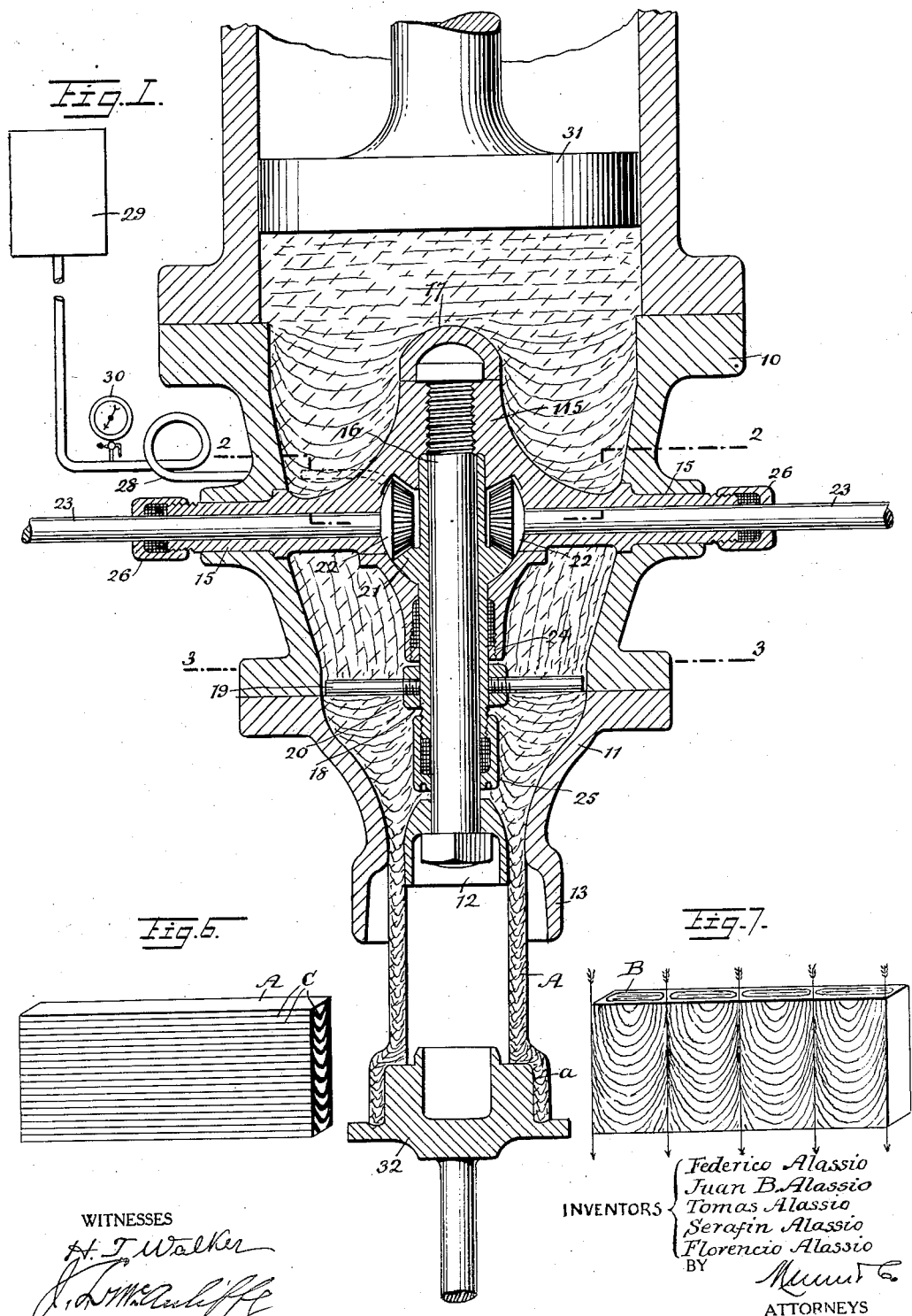
INVENTORS
Federico Alassio
Juan B. Alassio
Tomas Alassio
Serafin Alassio
Florencio Alassio
BY
ATTORNEYS
WITNESSES July 17, 1928. 1,677,808
F. ALASSIO ET AL
METHOD AND MEANS FOR PRODUCING EARTHENWARE
PIPES AND PRODUCTS RESULTING THEREFROM
Filed Oct. 29, 1925   2 Sheets-Sheet 2
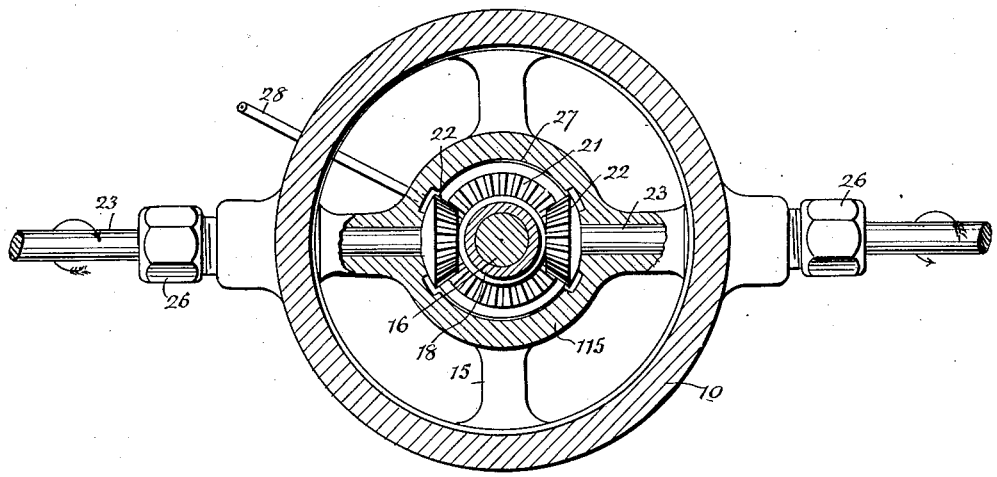
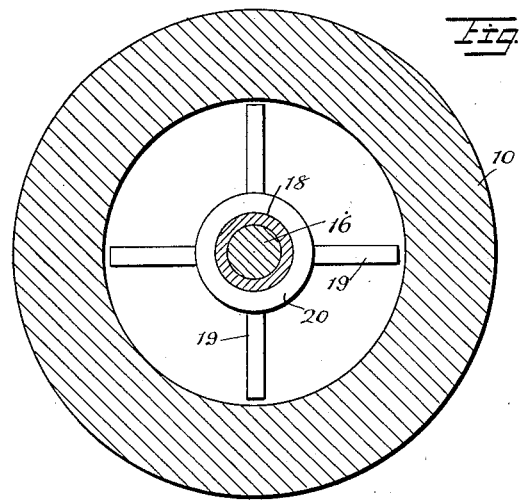
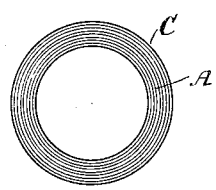
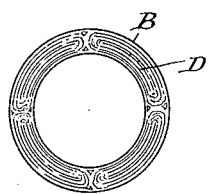
INVENTORS
Federico Alassio
Juan B. Alassio
Tomas Alassio
Serafin Alassio
Florencio Alassio Patented July 17, 1928.

1,677,808

UNITED STATES PATENT OFFICE.

FEDERICO ALASSIO, JUAN B. ALASSIO, TOMÁS ALASSIO, SERAFIN ALASSIO, AND FLORENCIO ALASSIO, OF PAYSANDU, URUGUAY.

METHOD AND MEANS FOR PRODUCING EARTHENWARE PIPES AND PRODUCTS RESULTING THEREFROM.

Application filed October 29, 1925, Serial No. 65,550, and in Uruguay March 12, 1925.

Our invention is based on the resisting attributes of the grain in articles made from homogenated plastic materials particularly those presenting laminations. It is well recognized how important for resistance and quality in such materials is the direction of their molecules and the character of the molecules and grain, the grain being termed in some countries "fibra" (fibers). This recognized fact has been already availed of in many industrial products.

An object of our invention is to produce a highly improved product in the form of an earthenware pipe or like article and to provide a method and means for producing the same and in which recognition is given to the maximum extent of the stated law respecting the importance of the direction of the grain in the product. In carrying out the stated object of utilizing the natural law referred to as regards the direction of the grain in the production of pipes and other articles from plastic materials, it will be readily understood how great is the importance of the manner in which laminating of the material is effected, looking toward quality and strength in the finished product.

Our method involves the extruding of plastic material in the formation of an earthenware pipe or the like. In machines as at present employed for the manufacturing of the products referred to, suitable means is provided to subject the material to pressure for continuously extruding the same. Usually, the forming of earthenware pipes by extrusion involves also the use of a cruciform cross piece in the mold or form. The carrying out of the laminating process of the plastic earthenware material as at present practiced is very faulty, it being impossible to obtain by the present method the strength which the earthenware material can give dependent, however, on the proper disposition of the grain and a correct mode of producing the laminations. When the plastic clay is placed in the ordinary machine, the extruding means employed to force the materials through the outlet where the die is provided to give the desired shape to the clay, the clay only reaches the die following detrimental phenomena which take place and in most cases are responsible for the failure of the products in many industries engaged in earthenware manufacture. For example, when passing through the cross piece of the cast box, the clay is cut in as many parts as there are arms on the cross piece and due to the resistance offered by the latter, there are in the cut pieces slidings of their molecules which compel them to aline in a direction longitudinal with the cut. The air bubbles which are of various size according to the particular character of the clay and always found in the plastic material remain adjacent the arms of the cross piece, held there by the resisting pressure, and then are carried usually in flattened form to the places where the several pieces of clay are to be united. A perfect union cannot be made by pressure alone and this is known to all practical potters as there is an air gap acting in opposition to the close union of the pieces where they come together. Also, in other places along the length of the plastic material the air bubbles which have been compressed expand in passing through the die and produce flaws and very detrimental deformations. Since the different displacements of the molecules are not modified when the product leaves the die, then by inspecting a tube for example, the following will be found, see Figures 5 and 7. Some parts of the tube are formed by the grain of the plastic material being disposed in a longitudinal direction while at other places the material is characterized by grain disposed in different directions and nearly always forming a curve due to resistance offered by the cross piece of the cast box and there are found present flaws and air bubbles. Although, apparently, pipe for example, formed by the present methods is in one piece, it is in fact formed of several plastic pieces poorly united. Moreover, as the contraction of the clay takes place during the firing and drying of the pipe, some of the contractions take place in the direction of the grain and since the directions of the grain vary, the direction of the contractions varies, whereas it should be of a uniform character and the result is that the pipe presents cracks that make it useless or presents displacement of its molecules which affects its quality and strength and such pipes break easily while in transportation or in handling. Not only so but it is difficult to cut such pipes to a desired given size because not all of its molecules offer a uniform resistance to the blows and the cut or break is uneven.

The defects mentioned are increased when using highly concentrated clay of fine structure or when a harder composition is to be made for which reason nearly always such clays are mixed with coarser clay especially when making the larger pipe but these mixtures, instead of bettering the material, diminish to a large extent the natural strength of the clay when used alone and in a more concentrated state.

Accordingly, an object of our invention is to provide a pipe or like product of structural integrality, and homogeneous, possessing a strength to be expected of uniform texture throughout and characterized by closeness of grain and homogeneity.

A more specific object is to produce a product in which the laminations and any folds or curves thereof will extend in unbroken spiral continuity in the product as contradistinguished from a product in which the laminations and folds thereof are formed of a plurality of separate portions defectively united to produce the annular form in the pipe.

Objects include also the formation of an earthenware pipe or like product in which the laminations and the grain run circumferentially about the axis of the pipe as distinguished from a direction longitudinally of the pipe, so that the laminations are disposed transversely as distinguished from longitudinally.

The manner and means whereby the stated objects and others are attained will clearly appear as the description proceeds.

Reference is to be had to the accompanying drawings forming a part of this specification, it being understood that the drawings are merely illustrative of one example of means for carrying out the invention.

Figure 1 is a central vertical section of a pipe extruding means forming part of our invention;

Figure 2 is a horizontal section on the line 2—2, Figure 1;

Figure 3 is a horizontal section on the line 3—3, Figure 1;

Figure 4 is a conventionalized end view of a pipe formed in accordance with our invention;

Figure 5 is a view similar to Figure 4 but showing by comparison an end view of the pipe as formed by present methods and indicating conventionally the laminations and grain;

Figure 6 is a conventionalized developed view of a section of pipe formed in accordance with our invention indicating the laminations and grain;

Figure 7 is a developed view of a section of pipe corresponding with Figure 5, as to the laminations and grain of the pipe.

In constructing extruding means for the carrying out of our invention in accordance with the illustrated example, a casing 10 is provided which has a separate contracted end 11 in which is disposed the chuck or die head 12 adjacent to which there is at the extreme terminal of the contracted lower end 11 the bell or offset annular flange 13 for the formation of the bell or flange $a$ on the extruded pipe A.

A four-armed cross piece 15 is provided having the arms thereof emanating from a hub 115 which forms a housing for certain gearing as hereinafter described. A shaft 16 is disposed axially in the hub 115 and therefore centrally in the casing 10, the shaft being here shown as in the form of a bolt having a cap 17 over the upper end thereof and disposed on the hub 115. On the shaft 16 is a sleeve or hollow shaft 18 and rigid with said hollow shaft is a plurality of arms 19 here shown as four in number, said arms being suitably secured to a ring 20 fast on said shaft 18. A bevelled gear 21 is formed integral with or otherwise rigid with the hollow shaft 18 and meshing with said gear wheel are bevelled pinions 22 on transverse shafts 23 disposed axially in two opposite arms of the cross piece 15 so that the pinions 22 are disposed at opposite sides of the gear wheel 21 to give balanced pressure on the sleeve 18. A stuffing box 24 is provided at the lower end of the hub 115 through which stuffing box 24 the hollow shaft 18 extends. Also, a stuffing box 25 is provided on the lower end of hollow shaft 18 through which the solid shaft or bolt 16 extends. Again, stuffing boxes 26 are provided on the ends of those arms of the cross piece 15 through which the shafts 23 extend. The gear wheel 21 and pinions 22 turn in a chamber 27 in the hub 115 of cross piece 15 and in order to supply oil to said chamber under pressure a lubricating pipe 28 discharges to said chamber 27. The pressure of the oil may be obtained in any suitable manner, there being shown for the purpose in the illustrated form an elevated tank 29, a pressure gage 30 being provided on the pipe 28. The pressure in the oil chamber 27 must be greater than the pressure in the casing 10 so that the plastic material from which the earthenware pipe is to be formed will not enter the bearings. Exudation of a limited quantity of oil or even an excess thereof to the housing 10 and plastic material is found not to be detrimental.

The numeral 31 indicates the piston operated under hydraulic or other pressure in the usual manner. The numeral 32 indicates the receding plunger conforming to the flange 13 and serving to form the bell $a$ of the pipe. The elements 31, 32 are well known and need no further explanation.

The speed under which the apparatus operates in practice will vary and depends on the kind of clay used, the fineness of texture, etc. and dimensions of the apparatus and on the number of rods 19 employed. The speed may be from 20 to 60 revolutions per minute in the sleeve 18 and at all events the speed must be in direct relation to the clay outlet from which the material is extruded. The described construction results in the desired strength of parts and unfailing accuracy of operation, and it permits of adjustment and repairs being made with facility. The arms 19 employed for the purpose in the illustrated example, it is to be observed, have a wiping action across the forwardly moving material in a zone near the forward end of the mass and in a plane adjacent the convergence of the material toward the point of extrusion. The wiping means is so located as to wipe over the material as it approaches the die and therefore the compacting and laminating resulting from the wiping action enter into and are incorporated in the pipe which is taking form directly in advance of said wiping action.

The above described method and means function to eliminate flaws in the pipe or other extruded article, they compact the material in the product to a marked edgree, and specifically it disposes the grain in a plane transverse to the axis of the pipe as distinguished from a longitudinal disposition of the grain and laminations. In the production of a pipe, for example, plastic clay upon being forced down by the piston is divided into four sections by the cross piece 15 and hub 115 but the four divisions of the material are always united by the pressure produced by the piston 31 as is the case with known pistons. Upon the plastic material reaching the revolving arms 19 the following phenomena take place; to wit: Due to the continuous turning and kneading of the molecules of the material about the axis of the device and pipe the difference of pressure caused by the resistance offered to the advance of the material while passing the cross piece 15 becomes uniform over the whole surface. Variations in density in the plastic material due to defective kneading are eliminated and homogeneity and uniform density are produced throughout the plastic material. Again, any air contained in the plastic material is minutely subdivided and uniformly distributed throughout the material, thereby preventing flaws or at all events making the flaws less detrimental in the finished product. The particular direction or various directions of the grain when the plastic material reaches the revolving rods or arms 19, are changed; said arms cause the molecules to be diverted from their longitudinal directions and guided in a direction parallel to the arms 19. As the plastic material advances to and past the arms 19, the revolving of said arms causes the plastic material to be transformed into thin layers so that successive accretions are added to the material in advance of the arms 19 and thoroughly compacted, the accretions being in effect convolute laminations extending about the axis of the sleeve 18 and shaft 16 and since in practice the revolving of the sleeve 18 and arms 19 is advantageously continuous to make the operation continuous, the laminations or the successive accretions of the material will be spirally disposed about the axis of the gradually forming pipe. The result is a laminated pipe or other article having a close and homogeneous texture possessing strength materially beyond earthenware articles heretofore produced by extrudation.

Comporing Figures 6 and 7 and also Figures 4 and 5, the article A produced by our invention and the article B produced by present methods, it will be seen that Figure 7 shows four developed sectors and these are necessarily imperfectly united. Moreover, the grain is local in the several sections. There are no spiral laminations and no circumferentially running grain in the article; it being observed that the laminations D follow each local sector being returned on themselves in the sector. On the other hand, in the sample A conventionally shown, it will be seen that the laminations C are spirally circumferential and are curved approximating a U or V shape between the side surfaces which would be the outer and inner surfaces of the pipe shown developed in Figure 6. This distinctive form of the laminations is due to the fact that there is a retardation of the advancing plastic material due to the skin friction at the hub 115 and at the inner surface of the casing 10, the material between the surface of the hub 115 and the inner surface of the casing 10 advancing more rapidly than adjacent to said surfaces and this holds true as the plastic material is extruded through the flange 13 and past the chuck or die head 12. The circumferential laminations (C) of Figures 4 and 6 are to be compared with the sector-shaped laminations (D) localized in the sector-shaped portions shown in Figures 5 and 7 and produced by the present methods of forming extruded products. The character of the laminations can be regulated as to the number of convolutions to the inch by varying the speed of rotation of the arms 20 relatively to the speed of movement of the material passing through the device. The necessity for variation of the laminations is determined by the character of the clay mixture and the degree of compactness desired.

We would state furthermore that while the illustrated example constitutes a practical means for carrying out our invention, we do not limit ourselves strictly to the exact details herein illustrated, since, manifestly, the same can be considerably varied without departure from the spirit of the invention as defined in the appended claims.

Having thus described our invention, we claim:

1. In a method of making an extruded article from plastic material, the steps of advancing said material under pressure, subdividing the material while under pressure, bringing the portions resulting from the subdivision together while maintaining the material under pressure and in addition to giving said material the said advancing movement, subjecting said material to a displacing movement in a circular direction in a plane transverse to the advancing movement prior to the extruding of the article.

2. In a method of making an extruded article from plastic material, the steps of advancing the material under pressure, subdividing the material while under pressure and producing the extruding article by forming said material into spiral laminations and compacting successive laminations, said laminating step and compacting step being in addition to the advancing movement of the material.

3. In a method of making an extruded article from plastic material, the steps of producing homogeneity and close texture in the extruded article by causing the mass of plastic material to advance toward the point of extrusion and subjecting a forward zone of the advancing mass to a lateral displacing action for the whole transverse area of the mass independently of the advancing movement.

4. In a method of making an extruded article from plastic material, subjecting the mass to a compound forward movement and to a lateral and circular displacement of its molecular structure while moving forward and additional to the advancing movement.

5. In a method of making an extruded article from plastic material, the steps which consist in advancing the plastic material under pressure and, in addition to the advancing movement of the material, compacting the same by subjecting said material to a sufficient displacing movement in a direction transverse to the direction of advance to change the disposition of the molecular structure of the mass.

6. In a method of making an extruded article from plastic material, the steps consisting in causing the material to have advancing movement, and, in addition to the advancing movement, subjecting said material to such a lateral displacement while advancing, as to dispose the grain of the mass in spiral form.

7. In a method of making an extruded article from plastic material; advancing said material under pressure toward the point of extrusion and in addition to the advancing movement imparted to the material, subjecting the advancing material to a lateral displacement at a higher rate of speed than the speed at which the material is advanced.

8. In a method of making an extruded article from plastic material, the steps of producing homogeneity and close texture in the extruded article, by causing the mass of plastic material to advance under pressure in the direction of the point of extrusion and, in addition, causing the advancing mass to assume the form of spiral laminations while the advancing mass is under pressure.

9. In a method of making an extruded article from plastic material, subjecting the mass of said material to pressure and while under pressure subjecting a forward zone of the mass adjacent the point of extrusion to a spiral displacement of its molecular structure while moving forward and distinct from the advancing movement.

10. In a method of making an extruded article from plastic material, causing a mass of the material to move under pressure toward the point of extrusion and while said mass is under pressure and, while moving forwardly, subjecting the forwardly moving mass to a compacting pressure in an annular direction about the axis of the mass.

11. In a method of making an extruded article from plastic material, the steps of placing a mass of the material under pressure to cause it to move forward under pressure and while under said pressure subjecting the material to a transverse wiping action for the complete cross section of the material as it approaches the point of extrusion and independently of the said pressure and of said forward movement.

12. The herein-described product consisting of an extruded article formed from plastic material in which the grain is disposed in the form of circumferential laminations.

13. The herein-described product consisting of an extruded hollow article formed of plastic material compacted into circumferential laminations with the laminations having bends between the inner and outer surfaces of the walls of said article.

14. In an apparatus for producing an extruded article, means to cause the material for the forming of the article to move forwardly, and means to displace a forward zone of the forwardly moving mass transversely as it moves forward for homogenizing the mass in the article, said second-mentioned means being additional to the first-mentioned means.

15. In a means for producing an extruded article, a structure through which the material to be extruded may be caused to move, and laminating means in said structure adapted to move transversely through the moving mass of material in addition to its partaking of the forward movement to form the forwardly moving mass into successive laminations.

16. In a means for producing an extruded article from plastic material, a structure through which the material to be extruded may be caused to have continuous movement, means to cause said continuous movement and a transversely disposed revoluble element acting additionally to said second means adapted to act on said material laterally to the direction of movement thereof to give the material as it enters into the formation of the article the form of a compacted spiral.

17. In an apparatus for producing an extruded article from plastic material, a structure adapted for the passage of the material to be extruded, means in said structure to place the mass of plastic material under pressure, and a revoluble element additional to said first means and projecting laterally a length to act transversely on the material for the whole cross sectional area thereof adjacent to the point of extrusion and move the material transversely.

18. In a means for producing an extruded article from plastic material, means to cause a movement of the material toward the point of extrusion, and means additional to said second means for exerting a wiping action across the material at substantially right angles to said movement as it approaches the point of extrusion.

19. In a means for producing an extruded article from plastic material, means to cause a forward movement under pressure of the material to be extruded, and means additional to said second means to exert a wiping action across the moving material as it approaches the point of extrusion.

20. In a means for producing an extruded article from plastic material, a structure affording a passage therethrough for said material, means to cause an advancing movement of the material, a transversely revolving element positioned to exert an annular wiping action through the material, and means to cause said element to turn at a speed so related to the speed of movement of the material that the action of said element forms spiral laminations in the material.

21. A means for producing an extruded article, said means including a structure affording a passage therethrough for the material to be extruded, means to cause an advancing movement of the material toward the point of extrusion, a rotary element additional to said advancing means to act transversely on the material before its extrusion, drive means for said rotary element, a housing for said drive means positioned within the material to be extruded as it moves to the point of extrusion, and means to induct a fluid into said housing, at a pressure resistant of any tendency of said material to enter said housing.

22. A means for producing an extruded article, said means including a structure affording a passage therethrough for the material to be extruded, means to advance said material under pressure, axially disposed means to give the moving material a hollow form in its passage through the said structure, and means to supply a lubricant within said axially disposed means at a pressure in excess of that exerted on said material.

23. A hollow clay article having its wall consisting of layers having integral coherency with the grain disposed circumferentially.

24. A hollow clay article having its wall consisting of relatively thin layers substantially V-shaped in cross section, said layers having integral coherency with the grain disposed circumferentially.

25. A hollow clay article having its wall consisting of layers having integral coherency with the grain disposed transversely to the axis.

26. Means for producing an extruded article including a structure affording a passage therethrough for the material to be extruded, means to force said material through said passage under pressure, an element lying in said passage in a plane transverse to the path of movement of the material to be extruded, said element being additional to said forcing means, drive means to give revoluble movement to said element in said of the said material to enter the drive means to a fluid under a pressure superior to the pressure to which said material is subjected so that said fluid is resistant of any tendency of the said material to enter the drive means or the bearings appurtenant thereto.

27. In a means for producing an extruded article from plastic material, means to cause a forward movement under pressure of the material to be extruded, and transversely disposed rod-like elements extending a length to exert a wiping action through and across the moving material for substantially the whole cross sectional area thereof.

FEDERICO ALASSIO.
JUAN B. ALASSIO.
TOMÁS ALASSIO.
SERAFIN ALASSIO.
FLORENCIO ALASSIO.

CERTIFICATE OF CORRECTION.

Patent No. 1,677,808. Granted July 17, 1928, to

FEDERICO ALASSIO ET AL.

It is hereby certified that error appears in the printed specification of the above numbered patent requiring correction as follows: Page 5, line 102, claim 26, strike out the words "of the said material to enter the drive means" and insert instead "plane, and means to subject said drive means"; and that the said Letters Patent should be read with these corrections therein that the same may conform to the record of the case in the Patent Office.

Signed and sealed this 21st day of August, A. D. 1928.

(Seal)

M. J. Moore,
Acting Commissioner of Patents